(12) United States Patent
Mangina

(10) Patent No.: US 6,818,865 B2
(45) Date of Patent: Nov. 16, 2004

(54) FOOD COOKING OVEN WITH STERILIZATION CONTROL ARRANGEMENT

(75) Inventor: Franco Tassan Mangina, Marsure (IT)

(73) Assignee: Electrolux Professional S.p.A., Pordenone (IT)

( * ) Notice: Subject to any disclaimer, the term of this patent is extended or adjusted under 35 U.S.C. 154(b) by 0 days.

(21) Appl. No.: 10/380,399
(22) PCT Filed: Jul. 17, 2001
(86) PCT No.: PCT/EP01/08233
§ 371 (c)(1), (2), (4) Date: Mar. 12, 2003
(87) PCT Pub. No.: WO02/23093
PCT Pub. Date: Mar. 21, 2002

(65) Prior Publication Data
US 2004/0020916 A1 Feb. 5, 2004

(51) Int. Cl.⁷ .............................. F24C 7/08; A21B 1/40; A23L 1/025
(52) U.S. Cl. ........................ 219/413; 219/494; 219/497; 219/506; 426/521; 99/329 R
(58) Field of Search ................................ 219/712, 713, 219/412, 413, 494, 497, 506; 422/108, 109; 426/521; 99/327, 329 R, 342

(56) References Cited
U.S. PATENT DOCUMENTS 3,875,854 A    4/1975   Wassenaar
4,036,995 A *  7/1977   Koether et al. ................ 99/342
4,093,841 A *  6/1978   Dills ............................ 219/712
4,816,269 A *  3/1989   Nelson et al. ............... 426/521
4,884,626 A   12/1989   Filipowski
5,634,719 A *  6/1997   La Neve ....................... 99/342
5,888,566 A *  3/1999   Alcaraz ....................... 426/521

FOREIGN PATENT DOCUMENTS

EP    0 794 387 A1    9/1997
WO    WO 01/73352    10/2001

* cited by examiner

Primary Examiner—Joseph Pelham
(74) Attorney, Agent, or Firm—Pearne & Gordon LLP

(57) ABSTRACT

Food cooking oven, comprising a thermometric probe adapted to be introduced in the food to be cooked and to generate a signal that is representative of the detected temperature, in which said signal is sent to appropriate processing and display means capable of working out a final information (F) depending in a combined manner on both the detected temperatures and the cooking time. The oven is further provided with selection means adapted to send selective commands to said processing means.

These processing means are furthermore adapted to automatically perform a comparison of said final information with said selective commands and issue respective signals, corresponding to the outcome of said comparison, towards appropriate indicator means. These signals are indicative of the period of time during which the food can be kept stored, ie. preserved after cooking, since they represent the bacterial count at the end of the cooking process.

7 Claims, 4 Drawing Sheets

MEATS

| HACCP category | Food |
|---|---|
| Minced/processed meat products | |
| A | Meat-loaf |
| A | Stuffed peppers |
| A | Roast sucking-pig, whole piece |
| A | Milan-style fried cutlets |
| A | Hamburgers |
| A | Stewed steaks |

| | |
|---|---|
| Whole (beef/pork) pieces | |
| B | Braised meat |
| B | Pork leg |
| B | Pork loin |
| B | Roast beef English-style |
| B | Veal loin |
| B | Whole veal shoulder |

| | |
|---|---|
| Smaller meat cuts / poultry | |
| A | Ducks |
| A | Chicken breasts |
| A | Chicken quarters |
| A | Whole chickens of 1.2 kg |
| A | Capons of 2.5 kg |
| A | Tongue |
| A | Rabbit |
| A | Whole lamb legs |
| A | Pork shanks |
| A | Turkey |
| A | Pork/veal escalopes | fig.5

FOOD COOKING OVEN WITH STERILIZATION CONTROL ARRANGEMENT

This application claims the benefit of International Application No. PCT/EP01/08233, which was published in English on Mar. 21, 2002.

DESCRIPTION

The present invention refers to a food cooking oven, in particular of the kind intended for use in catering and foodservice applications, provided with special features adapted to inform the operator, ie. the user about the bacterial count persisting in the food being handled, and in particular to give an information about the period of time during which the just cooked food can be kept stored, ie. can be preserved.

Food cooking oven are generally known to operate by transferring heat from the outside of the food being cooked to the inside thereof, and this circumstance unavoidably leads to the fact that the food itself is caused to undergo a differing heat treatment: in particular, the innermost portion of the food is capable of reaching the appropriate cooking temperature within a definitely longer time and, conclusively, this innermost portion generally is cooked to a lesser extent.

This phenomenon, which by the way is largely known in the art, is of particular relevance and significance in connection with those kinds of foodstuffs that come in the form of a compact mass with an outward facing surface that is rather small as compared wit the inner volume of the food; these kind of foodstuffs are mainly represented by whole pieces of meat, rolled meat pieces, pieces of minced meat such as meat loaves and the like.

In view of doing away with such a typical phenomenon of a non-homogeneous cooking effect or a poor cooking effect in the interior of the food being handled, it is a generally known practice in the art to provide some kind of thermometric probes, such as in particular the widely used pin-type core temperature probes, which are introduced in the interior of the food mass being cooked. The temperature information that is delivered by such probes is then used to control the cooking cycle, as an alternative to the cooking cycles that are on the contrary programmed according to the cooking time.

However, even such a use of core temperature probes is not sufficient in view of solving the problem of delivering a correct information about the risk that a food, although having been cooked, may still retain an unacceptably elevated bacterial count.

It is in fact a largely known fact that the residual bacterial content in a cooked food depends to a substantial extent on the actual time during which a given minimum temperature level is allowed to persist in the same food, ie. on the same food being allowed to remain at a minimum temperature level for a definite period of time, and such an information is not automatically and readily available in prior-art cooking ovens. As a matter of fact, in prior-art ovens the temperature is detected either in a continuous manner or at pre-determined intervals during the cooking cycle, and it is only at the end of such a cooking cycle that a skilled operator is able to judge whether the residual bacterial content in the cooked food is at an acceptable level or not.

However, such an information can solely be inferred, ie. is solely available if the operator of the oven is adequately trained to do such kinds of assessments, and even in his case only at the end of the cooking process, so that if the residual bacterial content is judged to be still in excess of an acceptable level, owing to the cooking cycle being already concluded, potentially dangerous conditions of uncertainty may well arise.

Furthermore, no automatic indication is given or available about the actual length of the period of time during which the just cooked food may be kept in store, ie. preserved before the bacterial content is likely to rise again to an unacceptable level. Last, but not least, if a thermometric core temperature probe inserted in the food to be cooked is used to control the cooking cycle, there is no certainty at all that the thereby measured temperature is actually the temperature prevailing in the coldest point within the food.

For instance, said solution is divulged form WO 01/73352, illustrating an invention that concerns a cooking device comprising a chamber for food provided with heating means with controlled operation, and room and internal temperature sensors, means for acquiring internal and room temperatures and a minimal decontamination value and a control module for monitoring the heating means in accordance with parameters based on the internal and room temperatures input and the decontamination value input; however said solution presents the above cited drawback that the measured temperature is actually the temperature prevailing in the coldest point in the food, and furthermore the control of the heating means based also on the cooking chamber temperature cannot assure that the temperature inside the food will rise at a pre-defined level for a given lenght of time.

From EP 0 794 387 a method for estimating the temperature of the inner portion of material to be cooked and thermal cooking apparatus using the same method are divulged; however said document does not teach how to solve the problems due to the detection of the actual lower temperature inside the food, and moreover the proposed method appears complicate and something unreliable due to the need that the physical properties of the food have to be learned and entered in the relevant oven.

A further basic element of uncertainty and, therefore, of potential dangerousness is due to the fact that the various foodstuffs have widely differing properties, ie. behave in a totally different manner in this connection, so that, as all those skilled in the art are well aware of, the bacterial count of a certain food that has gone through a standard cooking cycle, and that for this reason may then feature a significantly reduced bacterial content, can on the contrary turn out to be still unacceptably elevated in another kind of food that is treated using the same cooking cycle.

Finally, a further element that is placing pressure on the manufacturers of foodservice equipment in general, including food cooking ovens, is the European Directive no. 93/43 (the so-called HACCP-Directive, where the acronym stands for Hazardous Analysis and Critical Control Point), which is aimed at introducing hygiene, health-safeguard and safety requirements in food processing, cooking and storage equipment and processes.

The need is therefore strongly felt for providing a food cooking oven, particularly intended for foodservice and catering applications, which allows for the above mentioned drawbacks and risk situations to be right away eliminated or at least reduced to acceptable levels, and whose construction is not only simple, but makes also use of readily available techniques. Furthermore, the utilization of such a kind of oven shall be simple and filly within the capability of a normally skilled operator of food cooking ovens, in particular food cooking ovens used in foodservice and catering applications.

These aims, along with further features of the present invention are reached in a food cooking oven that is made and operates in accordance with the characteristics that are recited in the appended claims.

The present invention may be implemented according to a preferred, although not sole embodiment that is described in detail and illustrated below by way of non-limiting example with reference to the accompanying drawings, in which:

FIG. 5 is a view in table form of a representative classification of a plurality of different kinds of food according to HACCP criteria.

Figure 2:
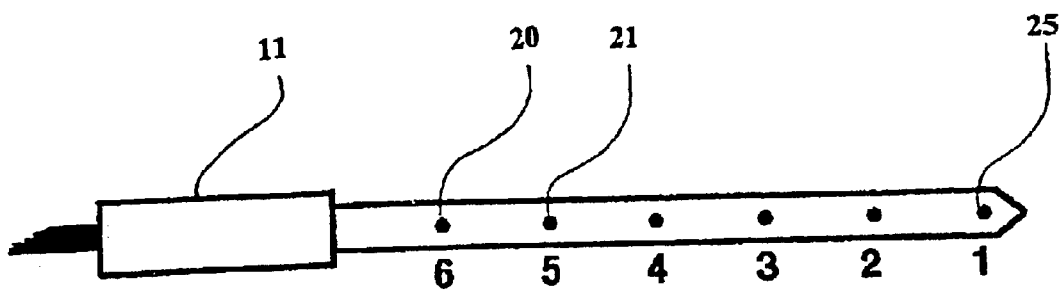
FIG. 2 is a side view of a pin-like core temperature probe according to the present invention.

The present invention is based essentially on following considerations: since the bacterial content in a food is generally known to vary as a function of both the temperature to which the food itself is exposed and the length of time of such exposure to said temperature, the possibility is given for a function to be plotted that links the reduction in the bacterial content with both these parameters and that, as a result, is representative of the evolution pattern of the same bacterial content in the food.

Such a function is commonly known as the function F, which is defined as:

the measure of the sterilizing effect F that is reached in the cooking process (a function of the kind of food product being handled and the micro-organisms that most probably are present in it):

$$F = D_{To}(\log N_o - \log N) = n D_{To} \quad (1)$$

where:

F=sterilizing effect or mortality rate.

$D_{To}$=decimal reduction or decay time for the micro-organism taken as a reference: it represents the length of time of exposure to the constant temperature $T_o$ that is necessary for the concentration of vital cells to be reduced by 10 times, ie. the length of time needed to attain the inactivation of 90% of the initially present cells or spores.

$T_o$=reference temperature (eg. 71° C. for pasteurization).

$N_o$=initial microbial concentration.

N=final microbial concentration.

n=number of resulting decimal reductions.

Having therefore so defined the function of bacterial content reduction, the possibility arises for a plurality of degrees of known reduction thereof to be defined as well, which correspond to respective values $F_o, F_1, F_2 \ldots F_n$ that such a function F can take.

As this will be exemplified further on, to these values there can be associated pre-established periods of preservability under storage conditions (ie. shelf life) of the food items having been processed.

In a few words, use is made of a conventionally established and acknowledged function of the evolution pattern of the bacterial count, ie. content in a food, and some characteristics of the hygienic state of the same food are identified experimentally along with the aptitude thereof to be kept in store, ie. preserved before its bacterial content rises again to an unacceptable level.

To these characteristics there are then associated a plurality of corresponding values which said function F may attain. It is quite apparent at this point that, if the evolution pattern of such a function F during a cooking cycle is plotted in a substantially continuous manner, it is possible for the moment to be detected, ie. identified, at which such a function successively reaches the various afore determined values of F. In this way, it is therefore possible to be continuously informed on the variation of the bacterial content of the food being cooked and, in short, the cooking cycle itself may be determined also by a suitable comparison of the values that are so successively reached by said function F with the corresponding pre-determined values.

Furthermore, in view of making the present invention still more interesting and adhering to the different reality of the various foodstuffs to be cooked, this method can be appropriately fine-tuned by programming the oven, or rather appropriate processing devices that control and adjust the oven, with the input of an information concerning the nature of the food being cooked. In other words, through an appropriate control means, which will be duly dealt with further on in this description, two or more categories of micro-biological dangerousness associated to the foodstuffs to be cooked can be entered.

Each such category of dangerousness is characterized by a different initial microbial concentration $N_o$, as well as different values of $D_{To}$ and z.

As a result, in correspondence of preestablished values of final microbial concentration N that can be assumed as being correlated with different shelf-life values, ie. different storability periods, there are to be found different values of $F_o, F_1, F_2 \ldots F_n$, which vary in accordance with the nature of the food being handled.

F is calculated by integrating the temperature T in the length of time t through the following relation derived from an elaboration of (1):

$$F = \int_{t_1}^{t_2} 10^{(T-To)/z} \cdot dt$$

where:

T=temperature at the core of the food (function of time)

$t_1$=instant to which there corresponds a temperature in excess of a specified value (eg. 50° C.)

$t_2$=instant of final reading z=temperature increment with respect to $T_o$ bringing about a decimal reduction $D_{To}$ (function of the heat resistance of the individual micro-organisms) and is therefore to be considered as a constant characteristics of the particular kind of food.

Figure 3:
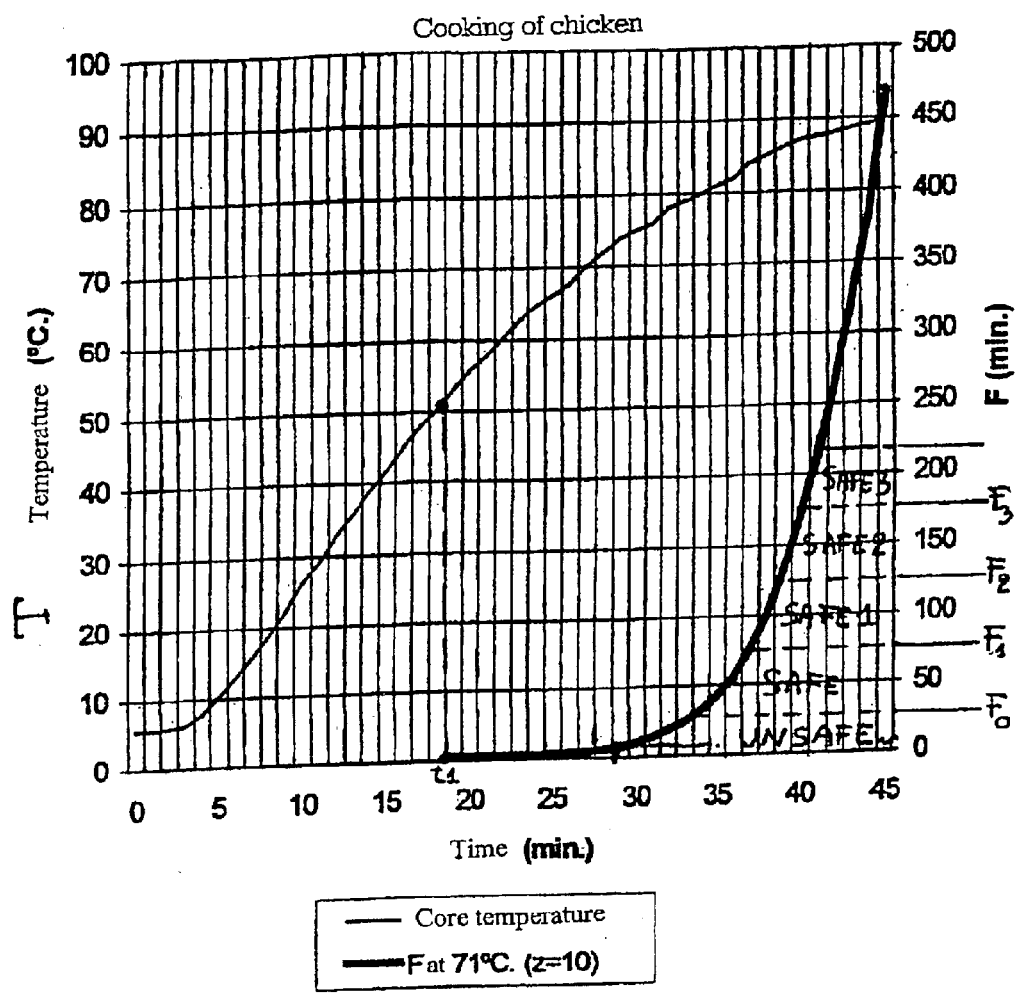
FIG. 3 is a diagrammatical view charting, in the same graph representation, the evolution pattern of both the core temperature in a food and the sterilizing effect F (as defined further on) as a function of the cooking time.
Figure 4:
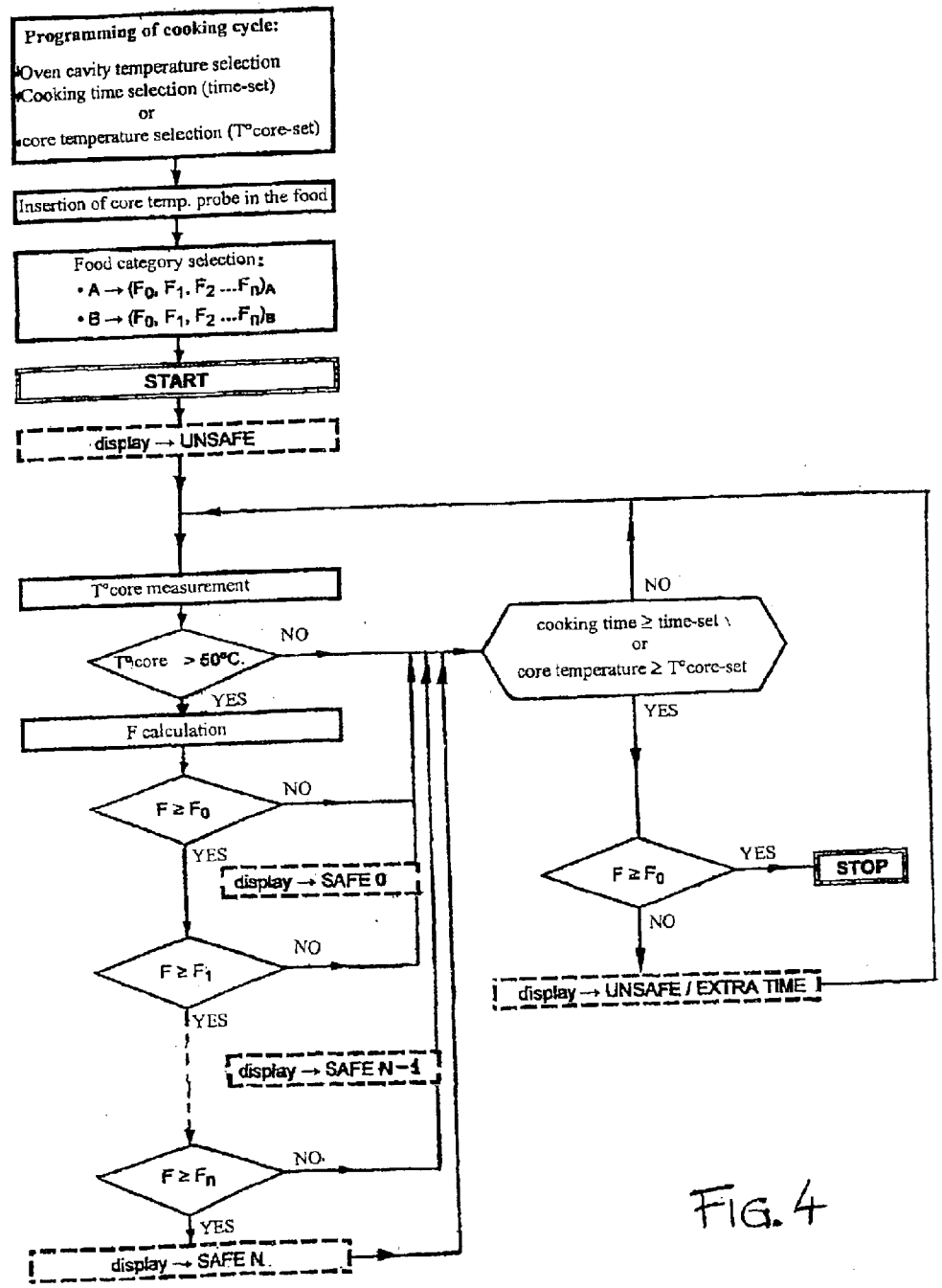
FIG. 4 is a logic flow chart of the operation of a food cooking oven according to the present invention.

With reference to FIG. 3, this can be noticed to plot, with the curve indicated at R, the evolution pattern of the core temperature, ie. the temperature at the innermost portion, of a typical piece of chicken, while the curve indicated at S in the same Figure illustrates the evolution pattern of the afore defined function F.

From this graph it can be noticed that the function F shows a sharply increasing evolution pattern starting from a minimum time of approx. 35 minutes, and furthermore that to a temperature of 90° C. there corresponds a function F of more than 460 and this datum will actually be used in the example appearing further on in this description.

Figure 1:
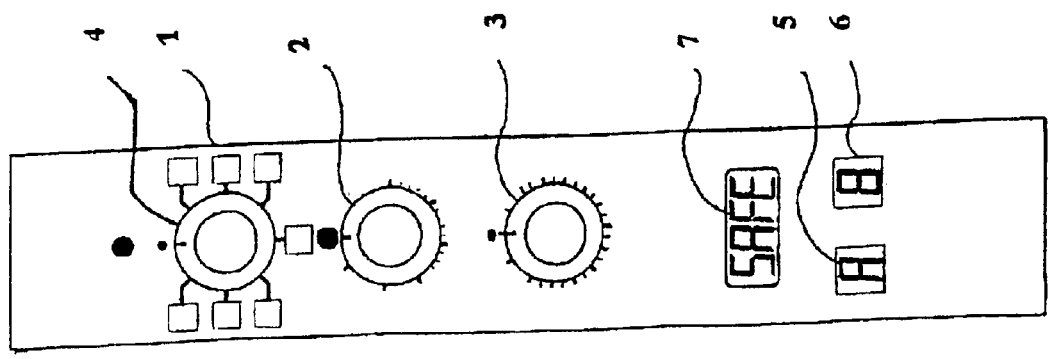
FIG. 1 is a symbolical view of the control and display panel of a food cooking oven according to the present invention.

With reference to FIG. 1, it should be noticed that the control and display panel 1 includes a thermostat switch 2, a timer switch 3 and, possibly, a cycle selector switch 4, wherein all such means are well-known and generally used in the art.

Anyway, the control and display panel according to the present invention further includes:

- a plurality of selector means 5, 6 (appearing in the form of push-buttons in the Figure)),
- a visual display 7 adapted to bring out information on the state of the reduction in the bacterial content in relation to the on-going cooking process.

It is also a largely known fact that foodstuffs of different nature usually feature different characteristics as far as the reduction in bacterial content as a function of cooking temperature and cooking time is concerned. In view of more effectively exemplifying such a circumstance, FIG. 5 illustrates a table in which, under the heading HACCP Classification, there appear some examples of both high-risk and medium-risk foodstuffs from a bacteriological point of view, along with respective rating codes A and B.

EXAMPLE

Food: Chicken $N_o$ (initial microbial concentration)=$10^4$ cells/g

N (final microbial concentration for consumption, ie. eating within 5 hours)=$10^2$ cells/g $T_o$=71° C. (pasteurisation temperature).

Reference Micro-organism:

*Lysteria monocytogenes* >>$D_{71}$=0.23 minutes, z=10

$t_1$: time corresponding to core temperature $T_{core}$=50° C.

$t_2$: end-of-cooking time.

Calculation of the safety value $F_o$ required in view of attaining a final microbial concentration N:

$$F_o = D_{To}(\log N_o - \log N) = 0.23 \ (\log 10^4 - \log 10^2) = 0.46 \text{ minutes}$$

which in other words means that the required sanitizing effect can be attained by means of a heat treatment process whose effectiveness is equivalent to a permanence for a time of 0.46 minutes at a constant temperature of 71° C.

Since the formula for the real-time calculation of the actual value of F is:

$$F = \int_{t_1}^{t_2} 10^{(T-71)/10} \cdot dt$$

the required safety condition is represented by:

$F > F_o$

During cooking, the value of F is calculated in a continuous manner, and is further compared with values $F_o$, $F_1$, $F_2$ ... $F_n$ that are contained in a pre-defined table, in which said values are associated to and characteristic of the kind or category of the food being each time handled.

In the above example and the associated FIG. 3, at the end of the cooking process, ie. after approx. 45 minutes, there results F=460, so that the safety condition requirement appears to be largely complied with, owing to a reduction in the bacterial content of $n = F/F_o = 460/0.46 = 1000$ having been obtained, ie. a bacterial content reduction by 1000 times.

At this point, all those skilled in the art should be fully capable of clearly understand how an oven according to the present invention actually operates: in fact, the oven operator selects one of the categories to which the food to be cooked belongs (eg. A or B) and enters such information through the proper selector means 5, 6 (wherein it shall of course be appreciated that this non-limiting example does not exclude the possibility for the food categories to be more than two, with said selector means being of course capable of entering exactly the identification of the selected food category).

Furthermore, the operator introduces in the food a pin-like thermometric core temperature probe 11 which is connected to appropriate decoding circuits to deliver compatible signals that can be used by an appropriate processing and control device (not shown).

As for the rest, the cooking oven is programmed in either a time-controlled or a temperature-controlled mode, in a largely traditional manner.

At the beginning of the cooking process, the processing and control device at the same time starts calculating the integral of the formula (1) in view of delivering at each single instant the value of F.

At each such instant, said processing and control device automatically compares the value of F, as this has so been just calculated, with a set of values $F_o$, $F_1$, $F_2$ ... $F_n$ that will have been appropriately pre-defined and stored in the unit's memory.

These values are determined experimentally for each category of food, A or B, as previously selected through said selector means 5, 6, in view of identifying the corresponding maximum allowable shelf-life, ie. the longest storage period before the bacterial content of the food increases again to an unacceptable value.

For instance, a determined code, eg. "SAFE 1", to be transmitted to said visual display 7, may be associated to a given value of F. The same applies to all other pre-determined values of F, as this is better exemplified in the Table below:

| Value of F | Display | Max. allowable shelf-life |
|---|---|---|
| F < $F_0$ | UNSAFE | |
| F > $F_0$ | SAFE-0 | 5 hours |
| F > $F_1$ | SAFE-1 | 1 day (refrigerated storage) |
| F > $F_2$ | SAFE-2 | 5 days (refrigerated storage) |
| ... | ... | |
| F > $F_n$ | SAFE-n | ... |

To the code SAFE-0 there will for instance correspond, for each selected category of food, a maximum allowable time of 5 hours before said food is eventually served for consumption; again, to the code SAFE-1 there may correspond a shelf-life of one day if the food is kept under correct refrigerated storage conditions.

In this way, at the end of the cooking process the operator is immediately informed about the cooked food having a more or less acceptable bacterial content, ie. the bacterial count thereof having been reduced to a more or less acceptable value, and the actual length of time during which the same food can then be kept in store before serving, without any risk, under particular pre-established storage or ambient conditions (eg. refrigeration).

A drawback may therefore arise in that, even upon the conclusion of a regularly performed cooking process, the value of F, ie. $F_{meas}$, comes to lie below a minimum pre-established value, ie. a value $F_o$ to which there corresponds the minimum shelf-life threshold value of five hours.

An advantageous improvement of the present invention then consists in adopting particular comparison, processing and control criteria and modes, such that, under the above cited circumstance (ie. $F_{meas}<F_o$), the cooking cycle is able to go on automatically at least until said value of F eventually reaches the value of $F_o$.

It will of course be appreciated that the above method may be advantageously accompanied by further devices and arrangements that are for instance capable of informing the operator, eg. through visual and/or sound indications, that the cooking process is automatically caused to go further on for a period of time as necessary for the above cited condition $F_{meas}<F_o$ to be attained.

A further improvement of the present invention consists in implementing said pin-like thermometric core temperature probe 11 in such a manner as to provide the same probe with a plurality of distinct points 20, 21, ... 25, each one of which is then capable of measuring the respective temperature and sending the corresponding information to said device 10.

This improvement practically ensures that, if the pin-like thermostatic probe is arranged in an inappropriate, ie. not so correct manner within the food to be cooked, the availability of more temperature probing points in it enables a number of respective, generally different temperature values to be sent to said processing device, among which the lowest one can then be identified.

Said lowest temperature value represents the temperature of the point that most probably is the coldest spot in the food being cooked, and can therefore be automatically selected as the temperature on which can then be based the calculation of the value of F that will of course be selected for carrying out the process in the most appropriate manner in accordance with the above illustrated principles.

What is claimed is:

1. A method of running a food cooking oven, intended in particular for use in foodservice and catering applications, comprising the introduction of a probe in the interior of the food being cooked and generating an electric signal that is representative of the detected temperature, in which said signal is sent to an appropriate processing and control device, characterized in that said processing and control device is adapted to work out an information (F) that depends in a combined manner on both the temperatures detected by said probe and the cooking time, and that said information is a value that is representative of the reduction in the bacterial content of the cooked food, and that said processing and control device selects, for the real-time calculation of said information (F), the lowest temperature being detected by a plurality of temperature sensors located at different points (20, 21, . . . 25) of said probe that is preferably a pin probe (11).

2. A method for running a food cooking oven according to claim 1, characterized in that it is further provided with selector means (5, 6) that are adapted to classify the food being cooked according to predefined categories (A, B) and to send a multiplicity of pre-defined values ($F_o$, $F_1$, $F_2$ . . . $F_n$), depending on the selected category, towards said processing and control device, which is in turn adapted to perform a comparison of such worked-out value of F with said values ($F_o$, $F_1$, $F_2$ . . . $F_n$) and to issue respective signals (UNSAFE, SAFE-0, SAFE-1, . . . ), corresponding, to the outcome of said comparison, towards appropriate indicator or display means (7).

3. A method for running a food cooking oven according to claim 2, characterized in that, if said comparison identifies a value of said information being lower than a pre-determined limit ($F_o$), a specific warning signal (UNSAFE) is automatically generated and issued for display (7).

4. A method for running a food cooking oven according to claim 3, characterized in that, if at the end of the cooking process said comparison gives a result of said value (F) being lower than a pre-determined limit ($F_o$), the cooking process itself is automatically caused to go further on until the outcome of said comparison eventually attains at least said pre-defined value ($F_o$), in which case the visual message on the display is updated accordingly (UNSAFE>$SAFE_0$).

5. A method for running a food cooking oven according to claim 2 or 3 or 4, characterized in that said respective signals (UNSAFE, SAFE-0, SAFE-1, SAFE-2 . . . ) are representative of the length of time during which said cooked food may then be kept in store before being served after cooking.

6. A method for running a food cooking oven according to any of the preceding claims, characterized in that said processing, ie. calculation is performed through the integration of the function that is representative of a temperature of the food being cooked.

7. A method for running a food cooking oven according to claim 1, characterized in that said probe is a pin-like core temperature probe (11) provided with a plurality of temperature sensors located at different points (20, 21, . . . 25), and that said processing and control device selects, for the real-time calculation of said information (F), the lowest temperature being detected by said plurality of temperature sensors.

* * * * *

UNITED STATES PATENT AND TRADEMARK OFFICE
CERTIFICATE OF CORRECTION

PATENT NO. : 6,818,865 B2
DATED : November 16, 2004
INVENTOR(S) : Franco Tassan Mangina It is certified that error appears in the above-identified patent and that said Letters Patent is hereby corrected as shown below:

Title page,
Insert Item -- [30] Foreign Application Priority Data,
        Sept, 13, 2000    (IT) .............................. PN2000A000054 --.

Column 2,
Line 64, please delete "filly" and insert therefor -- fully --.

Signed and Sealed this

Nineteenth Day of April, 2005

JON W. DUDAS
*Director of the United States Patent and Trademark Office*

UNITED STATES PATENT AND TRADEMARK OFFICE
CERTIFICATE OF CORRECTION

PATENT NO.    : 6,818,865 B2  
DATED         : November 16, 2004  
INVENTOR(S)   : Franco Tassan Mangina It is certified that error appears in the above-identified patent and that said Letters Patent is hereby corrected as shown below:

Column 8,
Line 35, please delete "any of the proceeding claims" and insert therefor -- claim 1 --.

Signed and Sealed this

Fourteenth Day of June, 2005

JON W. DUDAS
*Director of the United States Patent and Trademark Office*